United States Patent [19]

Abel et al.

[11] Patent Number: 4,713,132

[45] Date of Patent: Dec. 15, 1987

[54] APPARATUS AND METHOD FOR ULTRASONIC BONDING OF A MOVING WEB

[75] Inventors: Kent W. Abel, Black Creek; Gary N. Attoe, Kaukauna, both of Wis.

[73] Assignee: Kimberly-Clark Corporation, Neenah, Wis.

[21] Appl. No.: 861,014

[22] Filed: May 8, 1986

[51] Int. Cl.⁴ .................. B29C 65/08; B32B 31/20
[52] U.S. Cl. .................. 156/73.1; 156/290; 156/308.4; 156/497; 156/553; 156/580.1
[58] Field of Search ............. 156/73.1, 580.1, 580.2, 156/497, 73.2, 553, 290, 308.4; 228/1.1; 264/23

[56] References Cited

U.S. PATENT DOCUMENTS

| | | | |
|---|---|---|---|
| 3,242,029 | 3/1966 | Deans | 156/73.1 |
| 3,416,984 | 12/1968 | Chavannes et al. | 156/553 |
| 3,623,926 | 11/1971 | Sager | 156/73.1 |
| 3,733,238 | 5/1973 | Long et al. | 156/73.1 |
| 4,333,791 | 6/1982 | Onishi | 156/580.1 |
| 4,414,045 | 11/1983 | Wang et al. | 156/73.2 |

FOREIGN PATENT DOCUMENTS 1198349 12/1935 Canada .

Primary Examiner—Michael Wityshyn
Attorney, Agent, or Firm—Douglas L. Miller; Donald L. Traut; Jeremiah J. Duggan

[57] ABSTRACT

Apparatus for ultrasonically bonding a web of bondable material, comprising web transport means for moving the web along a web travel path, a plurality of ultrasonic bonding means disposed along the travel path, means for selectively energizing the ultrasonic bonding means, and carrier means for selectively moving the ultrasonic bonding means into intermittent bonding contact with the web during movement of the web along the travel path, such that the web is multiply untrasonically bonded during travel along said travel path by at least one of: (i) successive bonding contacts with a bonding site on the web by different ones of the plurality of ultrasonic bonding means, and (ii) simultaneous bonding contacts with a plurality of different web bonding sites by different ones of the ultrasonic bonding means. Also disclosed is a corresponding method of ultrasonically bonding a web of bondable material.

17 Claims, 5 Drawing Figures

APPARATUS AND METHOD FOR ULTRASONIC BONDING OF A MOVING WEB

BACKGROUND OF THE INVENTION

1. Field Of The Invention

The present invention generally relates to apparatus and method for ultrasonically bonding web materials, e.g., ultrasonically fusible thermoplastic materials, in a manner adapted for high-speed commercial operations.

2. Description Of The Related Art

U.S. Pat. No. 3,272,682 to L. Balamuth, et al discloses ultrasonically joining thermoplastic sheets with a rotary vibrator having at least one sealing tool at its periphery for rolling contact with the sheet against a back-up roller. The peripheral sealing tools may extend circumferentially and/or axially on the rotary vibrator, to join the sheet along seams either parallel or transverse to the direction of sheet movement.

Russian Pat. No. 785,051 describes ultrasonic seam welding of polymeric materials with a disc tool having a plurality of individual gapped segments applied to a toroidal converter by circular projections, wherein the toroidal converter has separate insulated sections and individual excitation windings for each segment. Material to be welded is fed to the welding zone between a supporting roller (anvil roller) and segments of the disc tool, while current is fed through a slip-ring and excitation windings to individual segments for conversion into ultrasonic energy passed intermittently to the welding zone.

SUMMARY OF THE INVENTION

In one aspect, the present invention relates to apparatus for ultrasonically bonding a web of bondable material, comprising: web transport means for moving the web along a web travel path; a plurality of ultrasonic bonding means having respective sonotrode bonding surfaces disposed along the travel path; means for energizing the ultrasonic bonding means; and carrier means for selectively moving the ultrasonic bonding means into intermittent bonding contact with the web during movement of the web along the travel path, such that the web is multiply ultrasonically bonded by at least one of: (i) successive engagements with a bonding site on the web by different ones of the plurality of ultrasonic bonding means, and (ii) simultaneous bonding contacts with a plurality of different web bonding sites by different ones of the ultrasonic bonding means.

In another aspect, the present invention relates to apparatus of the foregoing type wherein the web transport means comprises: a rotatable drum having an outer cylindrical surface; means for rotating the drum; and means for feeding the web onto the outer cylindrical surface at a first position, and for removing the web from the outer cylindrical drum surface at a second position circumferentially spaced-apart from the first position whereby the segment of the drum surface between the first and second positions defines the web travel path.

In still another aspect, the invention relates to apparatus of the aforementioned type, wherein the carrier means comprises: a plurality of horn rolls each having an outer carrier surface at which a respective sonotrode bonding surface is disposed, the outer carrier surface being positioned relative to the surface of the drum so as to bring the sonotrode bonding surface into bonding contact with a web carried on the outer cylindrical drum surface between the first and second positions thereof; and means to rotate the horn rolls to bring the sonotrode bonding surfaces into bonding contact position.

In yet another aspect, the invention relates to a method of ultrasonically bonding a web, comprising: moving the web along a web travel path; providing a plurality of ultrasonic bonding means along the path; energizing the ultrasonic bonding means at least when same are in bonding position; and engaging the ultrasonic bonding means with the web in bonding position during movement of the web along the travel path, to multiply ultrasonically bond the web by at least one of the steps of: (i) successively engaging the same bonding site on the web by different ultrasonic bonding means, and (ii) simultaneously engaging different web bonding sites by different ultrasonic bonding means.

In still another aspect, the invention relates to a method as described above, wherein the web travel path is defined by a rotatable drum having an outer cylindrical surface, comprising the further steps of: rotating the drum; feeding the web onto the outer cylindrical drum surface at a first position; and removing the web from the outer cylindrical drum surface at a second position circumferentially spaced-apart from the first position.

DETAILED DESCRIPTION OF THE PREFERRED EMBODIMENTS

As used herein, the term "web" refers to any suitable form of material, single-ply or multi-ply, which is ultrasonically bondable. For example, the web may comprise one or more sheets, films, laminates or composites, which may be moved along a travel path, such as an arcuate travel path, and ultrasonically bonded between a conventional sonotrode and anvil. The web may comprise a continuous web of material supplied from a roll of the same. Illustrative web materials generally useful in the practice of the present invention include thermoplastic sheets, films and fibers, synthetic fabrics, thermoplastic papers and foils and coated thermoplastic sheet materials. Useful synthetic fabrics include woven or nonwoven fabrics formed from fibers of polyolefins such as polyethylene or polypropylene, polyesters, polyamides, et cetera., as well as compatible copolymers, blends and mixtures thereof. The web may be a single-ply entity, such as where ultrasonic bonding is desired for reinforcement as in the case of edge regions to be subsequently formed by severing of the bonded portions of the web, or the web may be a multi-ply body.

The term "longitudinal" as used in description of the web refers to the machine direction of the web being treated, e.g., in the case of a continuous web, to the lengthwise direction along the web and the term "transverse" refers to the cross-direction which is perpendicular to the machine or longitudinal direction of the web.

Figure 1:
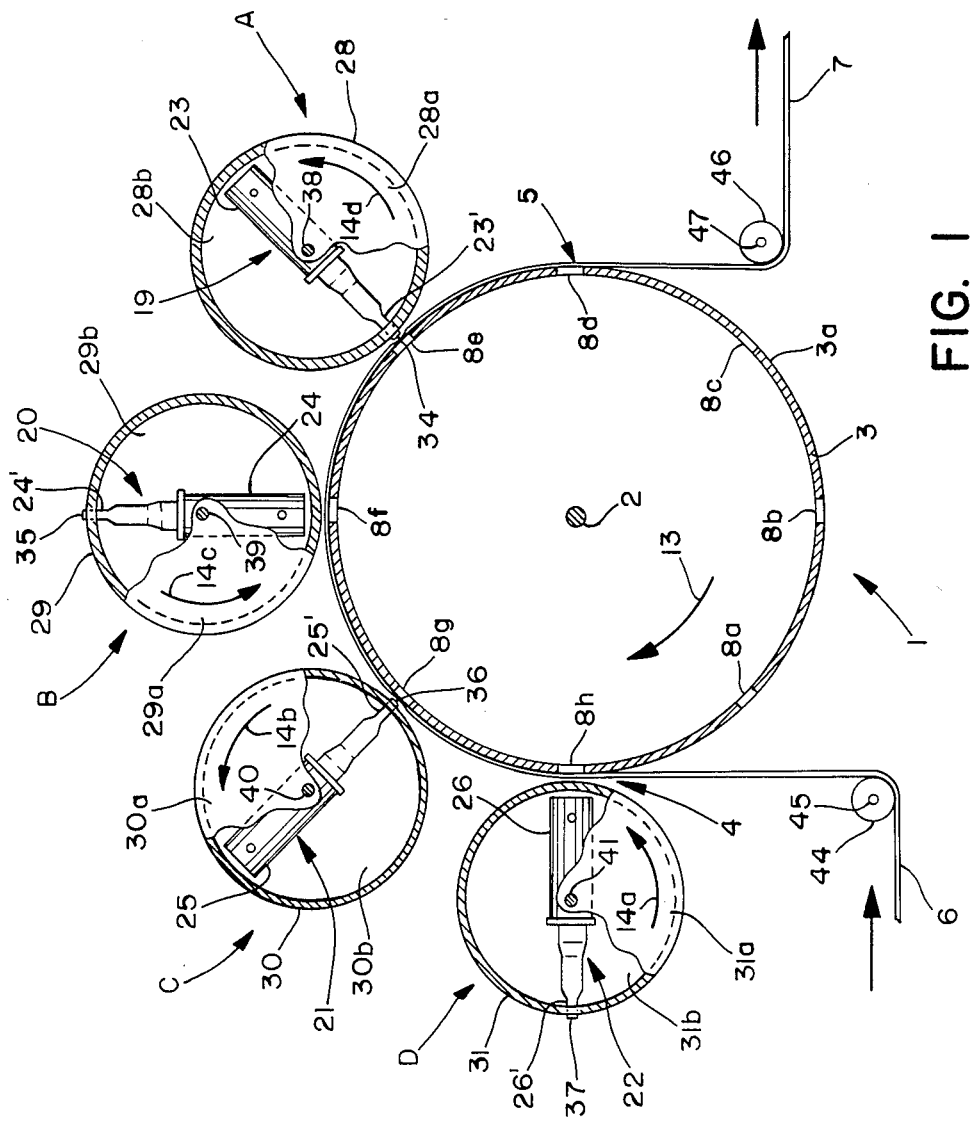
FIG. 1 is a side view in elevation of apparatus according to one embodiment of the present invention with certain parts omitted and others broken away for clarity of illustration.

Referring to the drawings, FIG. 1 shows a rotatable drum 1 mounted for rotation on shaft 2 and having a cylindrical wall 3 providing an outer cylindrical surface 3a. Mounting means for drum 1 as well as other useful and conventional supports, controls, et cetera. are omitted from FIG. 1 for clarity and simplicity of illustration. A web 6, which may comprise a continuous web supplied from a large roll thereof (not shown), is fed from feed roll 44 mounted on shaft 45 onto the outer cylindrical surface 3a of the rotatable drum 1 at a first position 4.

During rotation of the drum, such as by means of a drive motor operatively coupled to shaft 2 as described below in connection with FIG. 2, the web 6 travels along an arcuate web travel path on the outer cylindrical surface 3a of the drum, from the first position 4 through a bonding zone as described in more detail below, to a second position 5 at which the now multiply ultrasonically bonded web 7 is removed from the drum. The bonded web, which thus has a series of transversely extending, longitudinally spaced-apart bonds, is discharged from the apparatus by means of guide roll 46 mounted on shaft 47, and passed to storage or further processing.

The outer cylindrical surface 3a of the drum is provided with a series of anvils 8a-8h, which are spaced-apart, for example, 45° f arc from one another about the drum axis of rotation. Each of anvils 8a-8h extends transversely across the outer cylindrical surface 3a and serves to cooperate with the bonding surface portions of the sonotrodes as described below in order to effectuate the ultrasonic bonding operation. In FIG. 1, drum 1 is shown rotating in direction of arrow 13 at a point in its rotation in which anvils 8d-8h are located along the web travel path between the first and second positions 4, 5. Although the surfaces of the anvils are illustrated in FIG. 1 as being flush with the outer cylindrical drum surface 3a, the anvil surfaces, which are made of any material suitable for the purpose, e.g., a hardened steel, also may in other embodiments project outwardly from the drum surface 3a. In any case, the anvils are suitably mounted to the drum so as to be synchronously presented to a cooperating sonotrode by rotation of the drum as described below.

Associated with the rotatable drum is a plurality of horn rolls A, B, C and D, each comprising a respective cylindrical housing 28, 29, 30 and 31 having respective end walls 28a, 28b-31a, 31b, end walls 28a, 29a, 30a and 31a being broken away in FIG. 1. Each horn roll contains a respective ultrasonic horn 19, 20, 21 and 22 respectively comprising an electro-acoustic converter 23, 24, 25 and 26, coupled to a sonotrode 23', 24', 25' and 26'. Each cylindrical housing is mounted on a respective one of shafts 38, 39, 40 and 41 journaled in its respective end walls and joined to drive means (see FIG. 2) for rotation of the various horn rolls in the direction indicated by arrows 14a-14d. Each sonotrode terminates in a sonotrode outer bonding surface 34, 35, 36 and 37 which is elongated in shape (as shown in FIG. 2 with respect to sonotrode 24') and extends axially along the associated horn roll outer cylindrical surface, so that the respective bonding surfaces are presented to the web supported on the anvils during concurrent rotation of drum 1 and the horn rolls A-D. As shown in FIG. 1, the bonding surfaces 34 and 36 are respectively synchronized and in register with the corresponding anvils 8e and 8g. The bonding surfaces 34, 36 of horn rolls A and C are each positioned relative to the surface 3a of drum 1 so as to bring the sonotrode bonding surfaces into bonding contact with web 6 carried on surface 3a between first position 4 and second position 5 thereof. Anvils 8e and 8g of the rotatable drum 1 are synchronized to cooperate with bonding surfaces 34 and 36 to clamp therebetween web 6 in bonding contact.

Optionally the anvils 8a-8h may be exchanged with the ultrasonic horn including the sonotrode converter and the bonding surface to provide the bonding means.

Figure 2:
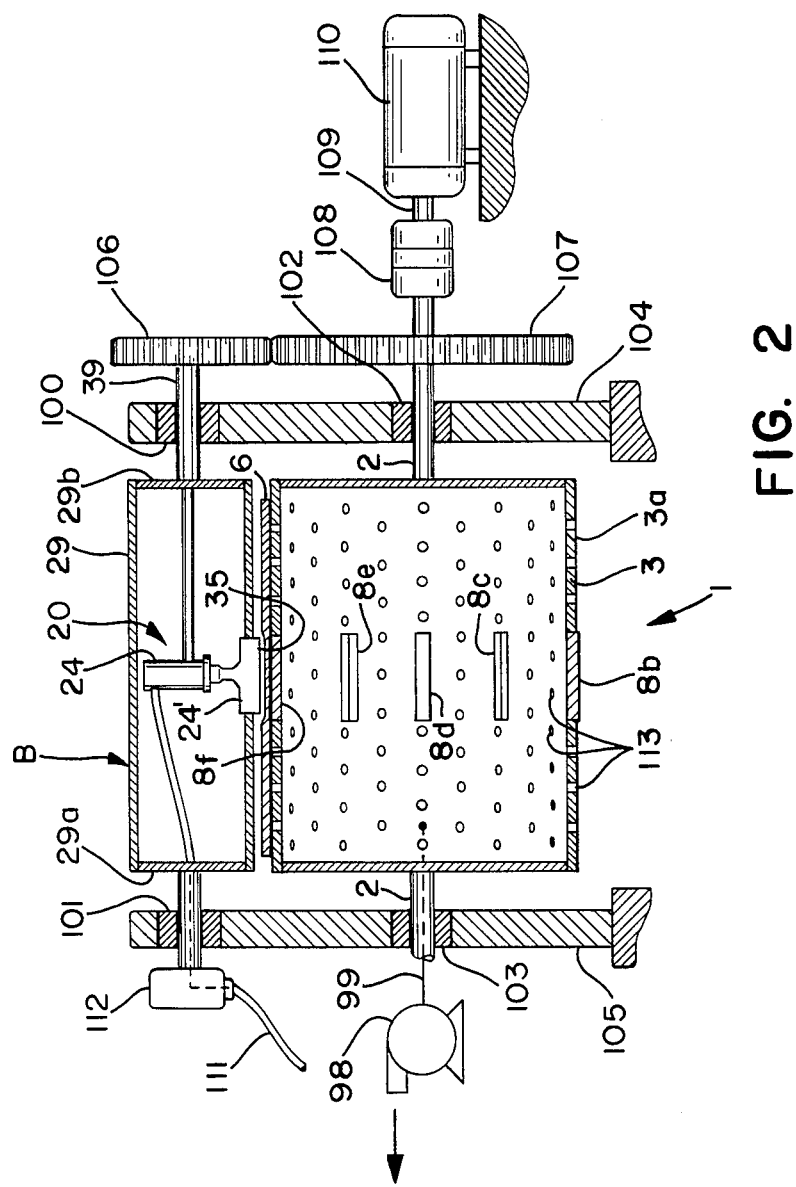
FIG. 2 is a schematic end view in elevation and on a reduced scale of the apparatus of FIG. 1, with parts omitted and broken away for clarity of illustration.

In FIG. 2, horn rolls D, C and A have been deleted for simplicity and clarity of illustration so that only horn roll B is shown. FIG. 2 shows drum 1 and horn roll B in a different relative position from that illustrated in FIG. 1. In FIG. 2, horn roll B is in its bonding position which is rotated 180° from the non-bonding position thereof shown in FIG. 1. Shaft 2 is shown mounted in bearings 102, 103 carried on supports 104, 105 for rotation by a drive motor 110, the drive shaft 109 of which is drivingly coupled to shaft 2 by shaft coupling 108. Also mounted on shaft 2 is a drum spur gear 107 meshing with a horn roll spur gear 106, for rotation of the latter with shaft 2. The horn roll spur gear 106 is mounted at one end of the horn roll shaft 39. Horn roll shaft 39 is mounted by means of bearings 100, 101 on the aforementioned supports 104, 105.

The end of shaft 39 opposite from spur gear 106 is hollow and is connected to a slip ring 112 for the power line 111 transmitting electrical power to the electro-acoustic converter 24 of the ultrasonic horn 20. Electro-acoustic converter 24 vibrates the sonotrode 24' and its bonding surface 35. The vibrational frequency of the sonotrode bonding surface may suitably be on the order of 20,000 Hz or higher.

The sonotrode 24' extends through an axially extending slot (unnumbered) in cylindrical housing 29 of the horn roll and protrudes radially outwardly from the slot for clamping of the web 6 between bonding surface 35 and anvil 8f. As shown in FIG. 1, each of the other horn rolls is constructed identically or similarly to horn roll B so that rotation of the respective housings of the horn rolls in selected synchronicity with drum 1 brings their respective sonotrode bonding surfaces into contact with selected ones of the anvils, 8a-8h.

The outer cylindrical drum wall 3 is foraminous, as seen in FIG. 2, having disposed in regular array across its surface a plurality of apertures 113 communicating with the interior of the drum. An exhaust blower 98 is coupled via a schematically illustrated exhaust conduit 99 to the interior of the drum 1, by means of a passage in the associated end of shaft 2 so that exhaust blower 98 imposes a negative pressure within drum 1 to grip, by means of apertures 113, web 6 securely onto outer cylindrical surface 3a.

The ultrasonic bonding operation is carried out by energizing the electro-acoustic converters so as to effectuate bonding when a sonotrode and anvil are brought into clamping contact with the web by the synchronized rotation of drum 1 and horn rolls A, B, C and D. For example, electro-acoustic converters 23 and 25 of the ultrasonic horns 19 and 21 are energized at least when their bonding surfaces 34 and 36 are in bonding position as shown in FIG. 1 with web 6 clamped between surfaces 34, 36 and associated anvils 8e, 8g. Ultrasonic vibrations generated in sonotrodes 23' and 25' effectuate the bonding in the position illustrated in FIG. 1. The bonding surfaces 35 and 37 of ultrasonic horns 20 and 22 in respective horn rolls B and D are out of phase by 180° with anvils 8f and 8h.

In such manner, the cylindrical housings 28–31 of the respective horn rolls, with the horn rolls acting as carrier means for the sonotrode bonding means, are continuously rotated to bring the sonotrode bonding surfaces of two of the horn rolls into simultaneous ultrasonic bonding contact with respective anvils on the rotatable drum surface, while the cylindrical housings of the two remaining horn rolls are positioned so that their sonotrode bonding surfaces are 180° out of phase with the anvils and the web and non-active portions of the cylindrical housings of these horn rolls are in contact with the web.

Dimensionally, the rotatable drum in a commercial embodiment of the FIG. 1 system used to ultrasonically bond light thermoplastic films and nonwoven materials, such as those used in the manufacture of disposable incontinence control garments, may have a nominal minimum diameter of 35.65 inches while the horn rolls each have a nominal minimum diameter of 17.83 inches when used with a 20,000 Hz sonotrode. In such embodiment, the respective horn rolls are spaced-apart from one another by angular segments of 45°, and are positioned equiradially with respect to the drum carrying the anvils, i.e., the radial distance as measured in FIG. 1 from the axis of rotation of the drum 1 to the axis of rotation of each horn roll A–D is the same.

In operation, the rotational speeds of the rotatable drum and horn rolls, sized as described above, may be set so that a rotation of the drum through an arc of 90° occurs concurrently with passage of each of the horn rolls through an arc of 180°, with the respective ultrasonic horn bonding surfaces "striking" the web opposite respective anvils in pairs as shown in FIG. 1. Alternatively, the drums and horn rolls may be respectively rotationally positioned to have the respective ultrasonic horn bonding surfaces striking respective anvils on the drum simultaneously, or in sequence, or in combinations of two or more such modes of operation. In practice, the system of the present invention may be widely varied in the relative diameter of horn rolls and drum and in rotational speed characteristics to provide correspondingly greater or lesser numbers of bonding contacts. The number of horn rolls per drum may also be varied.

Thus, within the broad scope of the present invention, a plurality of ultrasonic bonding means having respective sonotrode bonding surfaces are disposed along the web travel path along which the web is moved by web transport means. Means may be provided for selectively energizing the ultrasonic bonding means so that they are energized only during the time they are in bonding contact, or they may be continuously energized during operation of the apparatus. Carrier means selectively move the aforementioned ultrasonic bonding means into intermittent bonding contact with the web during its movement along the travel path, so that it is multiply ultrasonically bonded during travel along the travel path by at least one of: (i) successive bonding contacts with the same bonding site on the web by different ones of the plurality of ultrasonic bonding means, and (ii) simultaneous bonding contacts with a plurality of different web bonding sites by different ones of the ultrasonic bonding means.

Although the bonding surface the sonotrodes in the respective horn rolls in FIGS. 1 and 2 are shown as being disposed at or nearly adjacent the outer surface of the cylindrical housing of the horn rolls, it is within the purview of the present invention to utilize horn rolls in which the sonotrodes protrude from the cylindrical housings for a greater distance. In such instance, of course, the horn rolls would necessarily be spaced farther away from the rotatable drum 1, in order to provide proper spacing between the sonotrode bonding surfaces and the surfaces of the anvils.

By means of the construction shown in FIG. 1, a bonded web 7 is produced having elongated bonds positioned transversely of the web as best appreciated from FIG. 2, the size and the shape of the bonds corresponding to the size and shape of the anvils 8c–8e visible in FIG. 2. Adjacent bonds are longitudinally spaced apart from one another by distances corresponding to the angular 45° distance between adjacent anvils on the outer cylindrical surface 3a of drum 1.

It is of course within the scope of the present invention to provide a lesser or greater number of horn rolls associated with the rotatable drum to produce correspondingly lesser or greater numbers of bonds per unit length of the web.

As indicated hereinabove, each of the horn rolls A, B, C and D may be identically sized, with diameters which are a fixed proportion, e.g., one-half, of the diameter of drum 1, and with the horn rolls all being rotated at the same speed, which may be fixed relative to the rotational speed of the anvil drum so that the arc length travelled by the horn rolls is a fixed multiple of the arc length travelled by the anvil drum per unit of time, e.g., the arc length travelled by the horn rolls is twice that travelled by the drum per unit of time. For example, during a 90° revolution of drum 1, the horn rolls A–D undergo a 180° revolution. In such fashion, the bonded product web 7 is formed with a series of longitudinally spaced-apart, transversely extending ultrasonic bonds.

Figure 3:
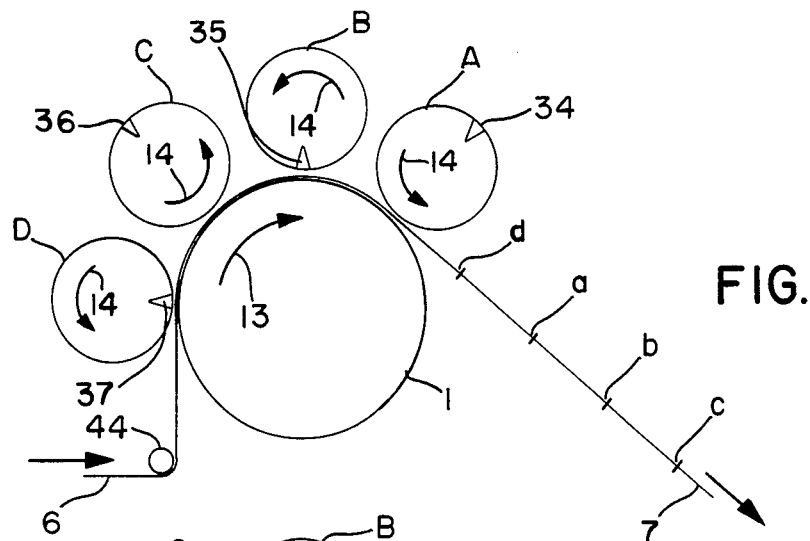
FIGS. 3-5 are partial schematic side views in elevation, on a reduced scale, schematically showing various modes of operation of the apparatus of FIG. 1.

FIG. 3 is a simplified schematic illustration of the FIG. 1 system with a location of sonotrode bonding surfaces 34, 35, 36, 37 indicated by wedge-shaped representations on respective horn rolls A, B, C and D. FIG. 3 shows the relative position of the horn rolls after a period of time in which the horn rolls have undergone a 180° revolution relative to their positions as shown in FIG. 1. Thus, the horn rolls B and D are in bonding position with respect to the web disposed on the outer cylindrical surface of drum 1, while the horn rolls A and C are 180° out of phase with respect to their strike positions. In such manner the continuous rotation of the horn rolls produces a product web as shown in FIG. 3 charaterized by a sequence of transversely extending ultrasonic bonds, in the order c, b, a, d so that FIGS. 1 and 3 reflect the simultaneous striking of the horn roll pairs A/C and B/D, respectively.

The ultrasonic bonding system shown and described with reference to FIGS. 1–3, and dimensionally sized as herein-earlier described with specific reference to FIG. 1, is of course suitable for bonding a variety of different ultrasonically bondable materials. For example, it is well suited for the bonding of a 4-ply web comprising outer layers of bonded carded polypropylene fibers and inner layers of ethylene-methyl-acrylate (EMA) films wherein the 4-ply web has a thickness of 0.030 inch, and the bond time (length of time during which the respective sonotrode bonding surface and anvil bonding surface are in contact with opposite faces of the web) is on the order of a total of 0.1 second.

It will be appreciated that in any given application of the present invention the rotational speed of the sonotrode and anvil elements will depend on the thickness and material composition of the web to be bonded. Specifically, as the thickness of a web of given material increases, the rotational speeds of the horn and anvil elements must decrease, all else remaining the same, including the frequency and amplitude of the ultrasonic vibrations.

Figure 4:
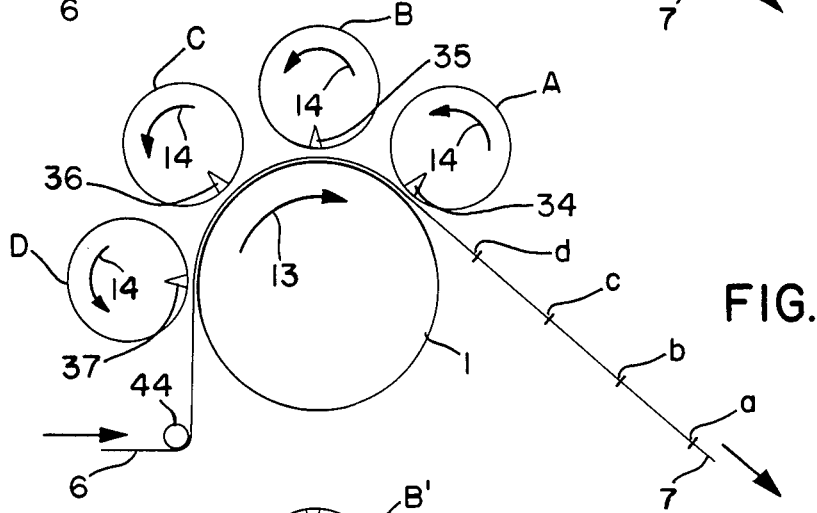

FIG. 4 is a simplified schematic illustration of the FIG. 1 ultrasonic bonding system as modified for simultaneous "striking" of the web by all four bonding rolls A–D. The drum 1 is rotated in the direction of arrow 13 and cooperates with the plural horn rolls A, B, C and D presenting ultrasonic bonding sonotrode surfaces 34, 35, 36 and 37, respectively, to the web 6. The web 6 is introduced via feed roll 44 onto the outer cylindrical surface of the drum, as each of the horn rolls rotates in the direction indicated by arrow 14. In this embodiment, the horn rolls are arranged to present their sonotrode bonding surfaces simultaneously to the web carried on the outer cylindrical drum surface. The product web 7 thus is provided with a series of longitudinally spaced-apart, transversely extending ultrasonic bonds in the sequence a, b, c, d.

Figure 5:
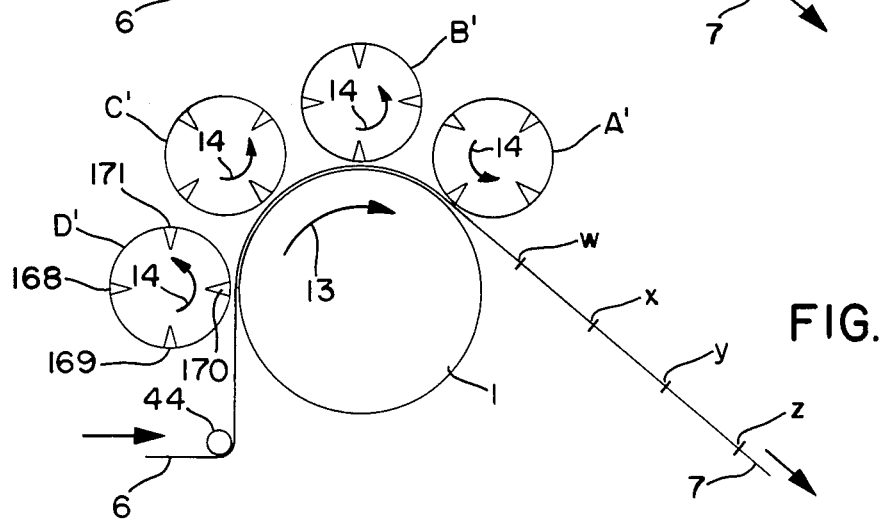

FIG. 5 is a simplified schematic illustration of the FIG. 1 ultrasonic bonding apparatus as modified according to another embodiment of the present invention. The apparatus comprises drum 1, rotated in the direction indicated by arrow 13 and receiving web 6 from feed roll 44 onto its outer cylindrical surface, for bonding by the sequential horn rolls A', B', C' and D'. Each of the horn rolls is driven in the direction indicated by arrow 14. In this embodiment, each of the horn rolls is provided with four axially extending sonotrode bonding surfaces on its cylindrical surface, with each sonotrode bonding surface spaced from adjacent bonding surfaces by arc lengths of 90°. Thus, horn roll D' comprises sonotrode bonding surfaces 168, 169, 170 and 171, which are schematically indicated by wedge-shaped marks. The sonotrode bonding surfaces on horn rolls A', B' and C' are shown, but not numbered.

By means of this arrangement, a product web 7 is produced with sequential longitudinally spaced-apart, transversely extending ultrasonic bonds z, y, x and w, wherein each bond has been "struck" four times, by sonotrode bonding surfaces of each of the four horn rolls in sequence. Thus, the horn rolls are each of the same diameter, which is, e.g., one-half of the diameter of drum 1, and the rotational speeds of the horn roll and anvil drum relative to one another are such that a 90° revolution of the drum corresponds to a 180° revolution of each of the horn rolls A'–D'.

In operation, as the web 6 passes from the feed roll 44 onto the outer cylindrical surface of drum 1, it is struck for example by sonotrode bonding surface 170 of horn roll D'. By the time that the resulting transversely extending ultrasonic bond produced by bonding surface 170 has reached horn roll C', an arc length of 45° on the drum 1, the horn roll C' has rotated 90° and brings its corresponding sonotrode bonding surface into contact with the bond produced by bonding surface 170 of horn roll D'. The sequence continues with the same bond then being struck by a bonding surface of horn roll B' and subsequently by a bonding surface of horn roll A' to produce a multiple-bonded portion of the web. Such "multi-strike" configuration of the ultrasonic bonding apparatus is highly advantageous by providing reproduceable ultrasonic bonds on the web even at high-speed operation. Even though the bonding time for a given sonotrode bonding surface of the specific horn roll is very brief under such conditions, the integrity of the bond nonetheless is increased by sequentially bonding the same web area by successive horn rolls.

It will be apparent from the foregoing that the concept utilized in FIG. 5 for the provision of multiply-bonded web portions may be utilized in other embodiments of the invention utilizing a greater or lesser number of horn rolls each utilizing a greater or lesser number of sonotrode bonding surfaces.

Further, although preferred embodiments of the invention have been described in detail, it will be appreciated that other modifications and variations are possible, together with other embodiments, and accordingly, all such apparent variations, modifications and embodiments are to be regarded as being within the spirit and scope of the present invention.

What is claimed is:

1. Apparatus for ultrasonically bonding a web of bondable material, comprising:

web transport means for moving the web along a web travel path; the web transport means comprising a rotatable drum having an outer cylindrical surface, means for rotating the drum, and means for feeding the web onto the outer cylindrical drum surface at a first position, and for removing the web from the outer cylindrical drum surface at a second position circumferentially spaced-apart from the first position, whereby the segment of the drum surface between the first and second position defines the web travel path;

a plurality of ultrasonic bonding means having respective sonotrode bonding surfaces and disposed along the travel path;

means for energizing the ultrasonic bonding means; and carrier means for selectively moving the ultrasonic bonding means into intermittent bonding contact with the web during movement of the web along the travel path, the carrier means comprising a plurality of horn rolls, each horn roll having an outer carrier surface at which a respective sonotrode bonding surface is disposed, each outer carrier surface being positionable relative to the surface of the drum so as to bring the sonotrode bonding surface into bonding contact with a web carried on the outer cylindrical drum surface between the first and second positions thereof, and means to rotate the horn rolls to bring the sonotrode bonding surface into the bonding contact position; such that the web is multiply ultrasonically bonded during travel along the travel path by at least one of: (i) successive bonding contacts with a bonding site on the web by different ones of the plurality of ultrasonic bonding means, and (ii) simultaneous bonding contacts with a plurality of diffferent web bonding sites by different ones of the ultrasonic bonding means.

2. Apparatus according to claim 1, wherein the means for rotating the horn rolls and the means for rotating the drum are arranged and constructed to provide for engagement of each sonotrode bonding surface portion with the web on the outer cylindrical surface of the drum at least once during movement of the web between the first and second position thereon.

3. Apparatus according to claim 2, wherein said drum rotating means and said horn rolls rotating means are arranged and constructed to provide for multiple engagements by each sonotrode bonding surface portion with the web on the outer cylindrical surface of the drum between the first and second positions.

4. Apparatus according to claim 1, wherein the horn rolls each have the same diameter and are arranged equiradially with respect to the axis of rotation of the drum.

5. Apparatus according to claim 1, wherein the horn rolls and means for rotating same are constructed and arranged so that at least two sonotrode bonding surface portions are in simultaneous engagement with the web carried on the outer cylindrical surface of the drum between the first and second positions.

6. Apparatus according to claim 1, wherein each of said horn rolls is of smaller diameter than the drum.

7. Apparatus according to claim 1, wherein the surface of the drum is foraminous, and vacuum suction means are interiorly disposed in the drum to impose a negative pressure on the surface for enhanced retention of the web thereon.

8. Apparatus according to claim 1, wherein the sonotrode bonding surface portions extend transversely across respective outer cylindrical surfaces of said horn rolls.

9. Apparatus according to claim 1, wherein said drum carries a plurality of anvils at radially spaced-apart locations on said outer cylindrical surface selected to bring respective anvils into facing relationship with respective sonotrode bonding surfaces in the travel path to nip therebetween the web to be bonded.

10. Apparatus according to claim 1, wherein each horn roll outer cylindrical surface comprises plural, circumferentially spaced-apart sonotrode bonding surface portions.

11. A method of ultrasonically bonding a web, comprising:

feeding the web to a first position along a web travel path defined by an outer cylindrical surface of a rotatable drum;

rotating the drum;

providing a plurality of ultrasonic bonding means along the path; the plurality of ultrasonic bonding means comprising a plurality of horn rolls, each horn roll (i) having an outer cylindrical surface comprising a sonotrode bonding surface portion and (ii) being positionable relative to the drum so that the outer cylindrical surface of the horn roll is positioned to engage its associated sonotrode bonding surface portion into bonding contact with a web carried on the outer cylindrical surface of a drum, the horn rolls being concurrently rotated during rotation of the drum;

energizing the ultrasonic bonding means at least when same are in bonding position;

engaging the ultrasonic bonding means with the web in bonding position during movement of the web along the travel path, to multiply ultrasonically bond the web by at least one of the steps of: (i) successively engaging the same bonding site on the web by different ultrasonic bonding means, and (ii) simultaneously engaging different web bonding sites by different ultrasonic bonding means; and removing the web from the outer cylindrical surface at a second position circumferentially spaced-apart from the first position.

12. A method according to claim 11, wherein the web is multiply ultrasonically bonded by successively engaging the same bonding site on the web by different ultrasonic bonding means.

13. A method according to claim 11, wherein the web is multiply ultrasonically bonded by simultaneously engaging different web bonding sites by different ultrasonic bonding means.

14. A method according to claim 11, wherein each sonotrode bonding surface portion is engaged with the web on the outer cylindrical surface of the drum at least once between the first and second position.

15. A method according to claim 14, wherein each sonotrode bonding surface portion multiply contacts the web at the outer cylindrical surface of the drum between the first and second positions.

16. A method according to claim 11, wherein the horn rolls each have the same diameter and are arranged equiradially with respect to the axis of rotation of the drum.

17. A method according to claim 11, wherein each of said horn rolls has an outer cylindrical surface comprising a plurality of circumferentially spaced-apart sonotrode bonding surface portions.

* * * * *